Patented July 2, 1935

2,006,545

UNITED STATES PATENT OFFICE 2,006,545

DYEING OR OTHERWISE COLORING OF MATERIALS MADE OF OR CONTAINING ESTERS AND ETHERS

George Holland Ellis and Henry Charles Olpin, Spondon, near Derby, England, assignors to Celanese Corporation of America, a corporation of Delaware No Drawing. Original application June 22, 1928, Serial No. 287,646. Divided and this application February 25, 1932, Serial No. 595,224. In Great Britain July 20, 1927

10 Claims. (Cl. 8—5)

This application is a divisional application from application S. No. 287,646 filed 22nd June, 1928. The invention relates to the dyeing, printing, stencilling or otherwise coloring of yarns, threads, knitted or woven fabrics or other products made with or containing cellulose acetate or other organic acid esters of cellulose, such for example as cellulose formate, propionate or butyrate or the products obtained by the treatment of alkalized cellulose with sulpho-chlorides (e. g. the product obtained with p-toluene sulpho-chloride and known as "immunized cotton"), or made of or containing cellulose ethers, such as methyl cellulose, ethyl cellulose, or benzyl cellulose, or the corresponding condensation products of cellulose and glycols or other polyhydric alcohols, all of which cellulose derivatives are hereinafter referred to as organic substitution derivatives of cellulose.

It is well known that azoic colorations may be produced upon cotton and like materials by applying an alkaline solution of an acetoacetyl developer, for example diaceto-acetyl-ortho-tolidide, which has the probable structural formula

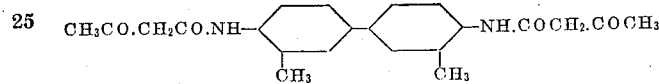

and coupling with a suitable diazo solution. This method is not applicable with success to the coloration of the type of material specified above, namely the organic substitution derivatives of cellulose, owing to the lack of substantive affinity for the fibre of the alkali derivative of the arylide. We have found, however, that highly satisfactory and valuable colorations may be obtained on materials comprising organic substitution derivatives of cellulose by applying the acetoacetyl component or other ketoacidyl component in the free state in the form of a dispersion.

The components applied may contain one or more acetoacetyl or other ketoacidyl groups, and may further contain other substituent groups, such as amino, substituted amino, hydroxy, alkoxy, halogen, carboxylic, or mercapto groups or the like and may be soluble or insoluble in water.

The amine or aminoazo coloring matter to be coupled on the fibre with the acetoacetyl component may be applied for example either before the said component or after. It is, however, essential that the acetoacetyl or other ketoacidyl component be applied in the free state.

According to the invention, for example, an amine or an aminoazo compound may be applied to the material, diazotized and developed with diacetoacetyl-tolidide in the free state in the form of a dispersion.

The components which are insoluble or insufficiently soluble in water may be applied in dispersion, and for this purpose may be dispersed in water, for example by dissolving in a solvent and mixing the solution with water containing if desirable protective colloids or dispersing agents, by grinding, or by pretreating the components with dispersing agents, e. g. those referred to in U. S. Patents Nos. 1,618,413, 1,618,414, 1,690,481, 1,694,413 and 1,716,721. Alternatively they may be dissolved in any suitable solvents and applied by dry dyeing methods.

The solutions, suspensions or dispersions may be applied to the materials by any methods known in the dyeing arts or they, and particularly the solutions in organic solvents, may be applied by spraying as described in U. S. Application S. No. 273,436 filed 27th April, 1928. For printing or stencilling they may be thickened with flour, starch, gum, dextrin or other thickeners.

For the production of compound shades the coloring matters of the present invention may be mixed with any other dyestuffs (diazotizable or otherwise) or components suitable for dyeing the cellulose derivative, for example basic dyestuffs, indigoid dyestuffs or esters of leuco indigoid dyestuffs or the insoluble colors now generally applied to cellulose acetate, for example coloring matters of any of the classes enumerated in prior U. S. Patents Nos. 1,618,413, 1,600,277, 1,618,415, 1,694,414 and 1,679,935.

The processes of the present invention may be applied to the dyeing or otherwise coloring of mixed materials comprising, in addition to cellulose acetate or other organic substitution derivatives of cellulose, silk, wool, or cotton or other cellulosic fibres, natural or artificial. The said other components may be dyed before, after or together with the cellulose ester or ether portion, for example with dyestuffs having no affinity for the ester or ether. For instance cotton, silk or wool may be dyed with direct cotton colors, or acid colors or anthraquinone vat colors, the cellulose acetate or other ester or ether being dyed with the ketoacidyl colors of the present invention.

The following example illustrates the invention but is not to be regarded as limiting it in any way:—

Example

To dye 100 lbs. of cellulose acetate knit fabric a full yellow shade:—

3 lbs. of diacetoacetyl-ortho-tolidide are dissolved in 6-7 gallons of hot water containing 1½ lbs. caustic soda, and poured into a 300 gallon dyebath containing 2½ grams of soap per litre. To this solution is then added cautiously 2¼ lbs. of glacial acetic acid in 2 gallons of water. The bath is agitated continuously to ensure fine dispersion of the diaceto-acetyl-ortho-tolidide thus precipitated from solution.

The well wetted out goods are now entered and the bath heated from cold to 80° C. in ¾ hour and maintained at this temperature a further hour. The goods are now lifted, rinsed, and developed in a 150 gallon bath containing 10 lbs. of p-nitro-diazonium chloride prepared in the usual manner, and to which sodium acetate has been added to neutralize mineral acid. The goods are worked in this bath for 1 hour in the cold, when development is complete and are then lifted, rinsed and dried or otherwise treated as requisite.

Instead of the cellulose acetate materials treated in the above example, materials made with or containing other organic substitution derivatives of cellulose, for example cellulose formate, cellulose propionate, methyl cellulose, ethyl cellulose or "immunized cotton" may be similarly colored.

What we claim and desire to secure by Letters Patent is:—

1. In the coloration of materials comprising organic substitution derivatives of cellulose by azoic methods, applying an acetoacetyl coupling components in the free state.

2. In the coloration of materials comprising organic substitution derivatives of cellulose by azoic methods, applying an acetoacetyl coupling component in the free state in aqueous dispersion.

3. In the coloration of materials comprising cellulose acetate by azoic methods, applying an acetoacetyl developer in the free state in aqueous dispersion.

4. In the coloration of materials comprising cellulose acetate by the azoic methods, applying acetoacetyl arylide coupling component in the free state in aqueous dispersion.

5. In the coloration of materials comprising cellulose acetate by the azoic process, applying an acetoacetyl developer in the free state and subsequently forming the color by applying a diazo solution.

6. In the coloration of materials comprising cellulose acetate by the azoic process, applying an acetoacetyl arylide coupling component in the free state and subsequently forming the color by applying a diazo solution.

7. In the process for coloring materials comprising organic substitution derivatives of cellulose by azoic methods, the step of applying in the free state coupling components which are di-(aceto-acetyl) derivatives of aromatic diamines.

8. In the process for coloring materials comprising organic substitution derivatives of cellulose by azoic methods, the step of applying diaceto-acetyl-ortho-tolidide in the free state.

9. In the process for coloring materials comprising cellulose acetate by azoic methods, the step of applying in the free state coupling components which are di-(aceto-acetyl) derivatives of aromatic diamines.

10. In the process for coloring materials comprising cellulose acetate by azoic methods, the step of applying diaceto-acetyl-ortho-tolidide in the free state.

GEORGE HOLLAND ELLIS.
HENRY CHARLES OLPIN.